US011269811B2

(12) United States Patent
Jiang et al.

(10) Patent No.: US 11,269,811 B2
(45) Date of Patent: *Mar. 8, 2022

(54) METHOD AND APPARATUS FOR MAXIMIZED DEDUPABLE MEMORY

(71) Applicant: Samsung Electronics Co., Ltd., Suwon-si (KR)

(72) Inventors: Dongyan Jiang, San Jose, CA (US); Qiang Peng, San Jose, CA (US); Hongzhong Zheng, Los Gatos, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

This patent is subject to a terminal disclaimer.

(21) Appl. No.: 16/595,441

(22) Filed: Oct. 7, 2019

(65) Prior Publication Data

US 2020/0042501 A1    Feb. 6, 2020

Related U.S. Application Data

(63) Continuation of application No. 15/823,549, filed on Nov. 27, 2017, now Pat. No. 10,437,785, and a
(Continued)

(51) Int. Cl.
*G06F 3/06* (2006.01)
*G06F 16/174* (2019.01)
(Continued)

(52) U.S. Cl.
CPC ........ *G06F 16/1748* (2019.01); *G06F 3/0608* (2013.01); *G06F 11/1453* (2013.01);
(Continued)

(58) Field of Classification Search
CPC ............ G06F 11/1453; G06F 16/1748; G06F 16/2255; G06F 3/0608; G06F 16/215; G06F 11/14; G06F 17/30; G06F 3/06
See application file for complete search history.

(56) References Cited

U.S. PATENT DOCUMENTS 5,796,939 A    8/1998  Berc et al.
6,088,777 A    7/2000  Sorber
(Continued)

FOREIGN PATENT DOCUMENTS

JP    H10260869 A    9/1998
JP    2009087021 A   4/2009
(Continued)

OTHER PUBLICATIONS

M. Yang, Y. Chang, T. Kuo and P. Huang, "Capacity-Independent Address Mapping for Flash Storage Devices with Explosively Growing Capacity," in IEEE Transactions on Computers, vol. 65, No. 2, pp. 448-465.*
(Continued)

*Primary Examiner* — Pierre Miche Bataille
(74) *Attorney, Agent, or Firm* — Renaissance IP Law Group LLP

(57) ABSTRACT

A memory system is disclosed. The memory system may include a Big Hash Table and a Little Hash Table. The memory system may also include an Overflow Region and a Translation Table to map a logical address to a Physical Line Identifier (PLID), which may include a region identifier and a physical address.

20 Claims, 13 Drawing Sheets

Related U.S. Application Data continuation-in-part of application No. 15/498,371, filed on Apr. 26, 2017, now Pat. No. 10,528,284, which is a continuation-in-part of application No. 15/476,757, filed on Mar. 31, 2017, now Pat. No. 10,678,704, which is a continuation-in-part of application No. 15/162,517, filed on May 23, 2016, now Pat. No. 10,496,543, and a continuation-in-part of application No. 15/161,136, filed on May 20, 2016, now Pat. No. 9,983,821.

(60) Provisional application No. 62/554,904, filed on Sep. 6, 2017, provisional application No. 62/453,461, filed on Feb. 1, 2017, provisional application No. 62/451,157, filed on Jan. 27, 2017, provisional application No. 62/450,502, filed on Jan. 25, 2017, provisional application No. 62/368,775, filed on Jul. 29, 2016, provisional application No. 62/316,402, filed on Mar. 31, 2016, provisional application No. 62/316,397, filed on Mar. 31, 2016, provisional application No. 62/314,918, filed on Mar. 29, 2016.

(51) Int. Cl.
  G06F 11/14 (2006.01)
  G06F 16/22 (2019.01)
  G06F 16/215 (2019.01)

(52) U.S. Cl.
  CPC ........ G06F 16/2255 (2019.01); *G06F 16/215* (2019.01); *G06F 2201/80* (2013.01)

(56) References Cited

U.S. PATENT DOCUMENTS

| | | |
|---|---|---|
| 6,438,560 B1 | 8/2002 | Loen |
| 7,650,460 B2 | 1/2010 | Cheriton |
| 7,818,495 B2 | 10/2010 | Tanaka et al. |
| 8,065,476 B2 | 11/2011 | Cheriton |
| 8,230,168 B2 | 7/2012 | Cheriton |
| 8,312,217 B2 | 11/2012 | Chang et al. |
| 8,504,791 B2 | 8/2013 | Cheriton et al. |
| 8,527,544 B1* | 9/2013 | Colgrove ............. G06F 3/0608 707/791 |
| 8,612,673 B2 | 12/2013 | Cheriton |
| 8,688,661 B2 | 4/2014 | Greiner et al. |
| 8,935,446 B1 | 1/2015 | Shilane et al. |
| 8,938,580 B2 | 1/2015 | Cheriton |
| 9,069,782 B2 | 6/2015 | Yang et al. |
| 9,213,649 B2 | 12/2015 | Koka et al. |
| 9,256,368 B2 | 2/2016 | Welnicki et al. |
| 9,501,421 B1 | 11/2016 | Cheriton |
| 9,520,193 B2 | 12/2016 | Cheriton |
| 9,639,274 B2 | 5/2017 | Maranna et al. |
| 9,921,773 B2 | 3/2018 | Georgiev |
| 9,966,152 B2 | 5/2018 | Hu et al. |
| 9,983,821 B2 | 5/2018 | Sala et al. |
| 10,114,772 B1* | 10/2018 | Steinmacher-Burow ..................... G06F 13/1684 |
| 10,255,287 B2 | 4/2019 | Sarab et al. |
| 10,592,150 B2* | 3/2020 | Sakamoto ............. G06F 3/0608 |
| 2008/0229056 A1 | 9/2008 | Agarwal et al. |
| 2009/0089183 A1* | 4/2009 | Afram ................ G06Q 30/0601 705/26.1 |
| 2011/0161553 A1 | 6/2011 | Saxena et al. |
| 2011/0258404 A1 | 10/2011 | Arakawa et al. |
| 2012/0072644 A1* | 3/2012 | Asano ................ G06F 12/0246 711/103 |
| 2012/0102260 A1 | 4/2012 | Kawamura et al. |
| 2012/0150954 A1 | 6/2012 | Tofano |
| 2012/0166448 A1 | 6/2012 | Li et al. |
| 2012/0179853 A1* | 7/2012 | Manning ............. G06F 12/1045 711/3 |
| 2012/0260021 A1 | 10/2012 | Rudelic |
| 2013/0024645 A1 | 1/2013 | Cheriton et al. |
| 2013/0086006 A1* | 4/2013 | Colgrove ............ G06F 16/1752 707/692 |
| 2013/0151759 A1 | 6/2013 | Shim et al. |
| 2013/0275699 A1 | 10/2013 | Cheriton |
| 2013/0332927 A1 | 12/2013 | Tang et al. |
| 2014/0181119 A1 | 6/2014 | Chiueh et al. |
| 2014/0281361 A1 | 9/2014 | Park et al. |
| 2015/0074339 A1 | 3/2015 | Cheriton |
| 2015/0089168 A1* | 3/2015 | Kalyanasundharam ..................... G06F 12/0607 711/157 |
| 2015/0089183 A1* | 3/2015 | Bains .................. G06F 12/0292 711/202 |
| 2015/0370495 A1* | 12/2015 | Georgiev .............. G06F 3/0641 711/114 |
| 2015/0370835 A1 | 12/2015 | Yochai |
| 2016/0284151 A1 | 9/2016 | Fujimura et al. |
| 2016/0291891 A1 | 10/2016 | Cheriton |
| 2017/0017547 A1 | 1/2017 | Broede et al. |
| 2017/0109049 A1 | 4/2017 | Cheriton |
| 2017/0161329 A1 | 6/2017 | Chambliss et al. |
| 2017/0286004 A1 | 10/2017 | Hu et al. |
| 2017/0286010 A1 | 10/2017 | Jiang et al. |

FOREIGN PATENT DOCUMENTS

| | | |
|---|---|---|
| JP | 2013514560 A | 4/2013 |
| JP | 2014513345 A | 5/2014 |
| JP | 2015108931 A | 6/2015 |
| KR | 20170112952 A | 10/2017 |
| KR | 20170112953 A | 10/2017 |
| TW | I533219 B | 5/2016 |
| WO | 2015108931 A1 | 7/2015 |

OTHER PUBLICATIONS

Cheriton et al., "HICAMP: Architectural Support for Efficient Concurrency-safe Shared Structured Data Access," ASPLOS '12, Mar. 3-7, 2012, pp. 287-299.

Kim, Yoongu, Cheriton et al., "HICAMP: Architectural Support for Efficient Concurrency-Safe Shared Structured Data Access," ASPLOS 2012, Nov. 18, 2013, 43 pages.

Litz et al., "Fine-grain Memory Deduplication for In-memory Database Systems," Sep. 23, 2013, 22 pages.

Notice of Allowance for U.S. Appl. No. 15/823,549, dated May 23, 2019.

Office Action for U.S. Appl. No. 15/823,549, dated Jan. 28, 2019.

Stevenson, John Peter, Fine-Grain In-Memory Deduplication for Large-Scale Workloads, A dissertation submitted to the Department of Electrical Engineering and the Committee on Graduate Studies of Stanford University in partial fulfillment of the requirements for the Degree of Doctor of Philosophy, Dec. 2013, 140 pages.

Fu, Yinjin, et al., "Application-Aware Local-Global Source Deduplication for Cloud Backup Services of Personal Storage," IEEE Transactions on Parallel and Distributed Systems, vol. 25, No. 5, May 2014, pp. 1155-1165.

* cited by examiner

METHOD AND APPARATUS FOR MAXIMIZED DEDUPABLE MEMORY

RELATED APPLICATION DATA

This application is a continuation patent application of U.S. patent application Ser. No. 15/823,549, filed on Nov. 27, 2017, which claims the benefit of U.S. Provisional Patent Application Ser. No. 62/554,904, filed Sep. 6, 2017, U.S. Provisional Patent Application Ser. No. 62/453,461, filed Feb. 1, 2017, U.S. Provisional Patent Application Ser. No. 62/451,157, filed Jan. 27, 2017, and U.S. Provisional Patent Application Ser. No. 62/450,502, filed Jan. 25, 2017, all of which are incorporated by reference herein for all purposes.

This application is a continuation-in-part of U.S. patent application Ser. No. 15/498,371, filed Apr. 26, 2017, now pending, which is a continuation-in-part of U.S. patent application Ser. No. 15/476,757, filed Mar. 31, 2017, now pending, and claims the benefit of U.S. Provisional Patent Application Ser. No. 62/453,461, filed Feb. 1, 2017, U.S. Provisional Patent Application Ser. No. 62/451,157, filed Jan. 27, 2017, U.S. Provisional Patent Application Ser. No. 62/450,502 filed Jan. 25, 2017, and U.S. Provisional Patent Application Ser. No. 62/368,775, filed Jul. 29, 2016, all of which are incorporated by reference herein for all purposes. U.S. patent application Ser. No. 15/476,757 is a continuation-in-part of U.S. patent application Ser. No. 15/162,517, filed May 23, 2016, now pending, and of U.S. patent application Ser. No. 15/161,136, filed May 20, 2016, now pending, and claims the benefit of U.S. Provisional Patent Application Ser. No. 62/453,461, filed Feb. 1, 2017, U.S. Provisional Patent Application Ser. No. 62/451,157, filed Jan. 27, 2017, U.S. Provisional Patent Application Ser. No. 62/450,502 filed Jan. 25, 2017, U.S. Provisional Patent Application Ser. No. 62/368,775, filed Jul. 29, 2016, and U.S. Provisional Patent Application Ser. No. 62/316,402, filed Mar. 31, 2016, all of which are incorporated by reference herein for all purposes. U.S. patent application Ser. No. 15/162,517 claims the benefit of U.S. Provisional Patent Application Ser. No. 62/316,397, filed Mar. 31, 2016, both of which are incorporated by reference herein for all purposes. U.S. patent application Ser. No. 15/161,136 claims the benefit of U.S. Provisional Patent Application Ser. No. 62/314,918, filed Mar. 29, 2016, both of which are incorporated by reference herein for all purposes.

FIELD

The inventive concepts relate generally to memory, and more particularly to maximizing dedupable memory.

BACKGROUND

Deduplicated (or dedupable) memory provides a more efficient mechanism in which to store data. In traditional memory solutions, each data object is written to its own location in memory. The same data object might be stored in any number of locations in memory, each as a separate copy: the memory system has no way to identify or prevent this repetitious storage of data. For data objects that are large, this repetitious storage of data may be wasteful. Dedupable memory, which stores only a single copy of any data object, attempts to address this problem.

Some dedupable memory utilizes Hash Tables to store the data objects. But the Hash Tables may only be incremented by mechanisms that double its size. This large increment granularity often leaves a large portion of memory that may not be used as dedupable memory, and is treated simply as an Overflow Region. Since the Overflow Region memory is not dedupable, the overall dedupe ratio thus drops when a big portion of memory is not dedupable.

A need remains for a way to increase the portion of memory that is subject to deduplication.

DETAILED DESCRIPTION

Figure 1:
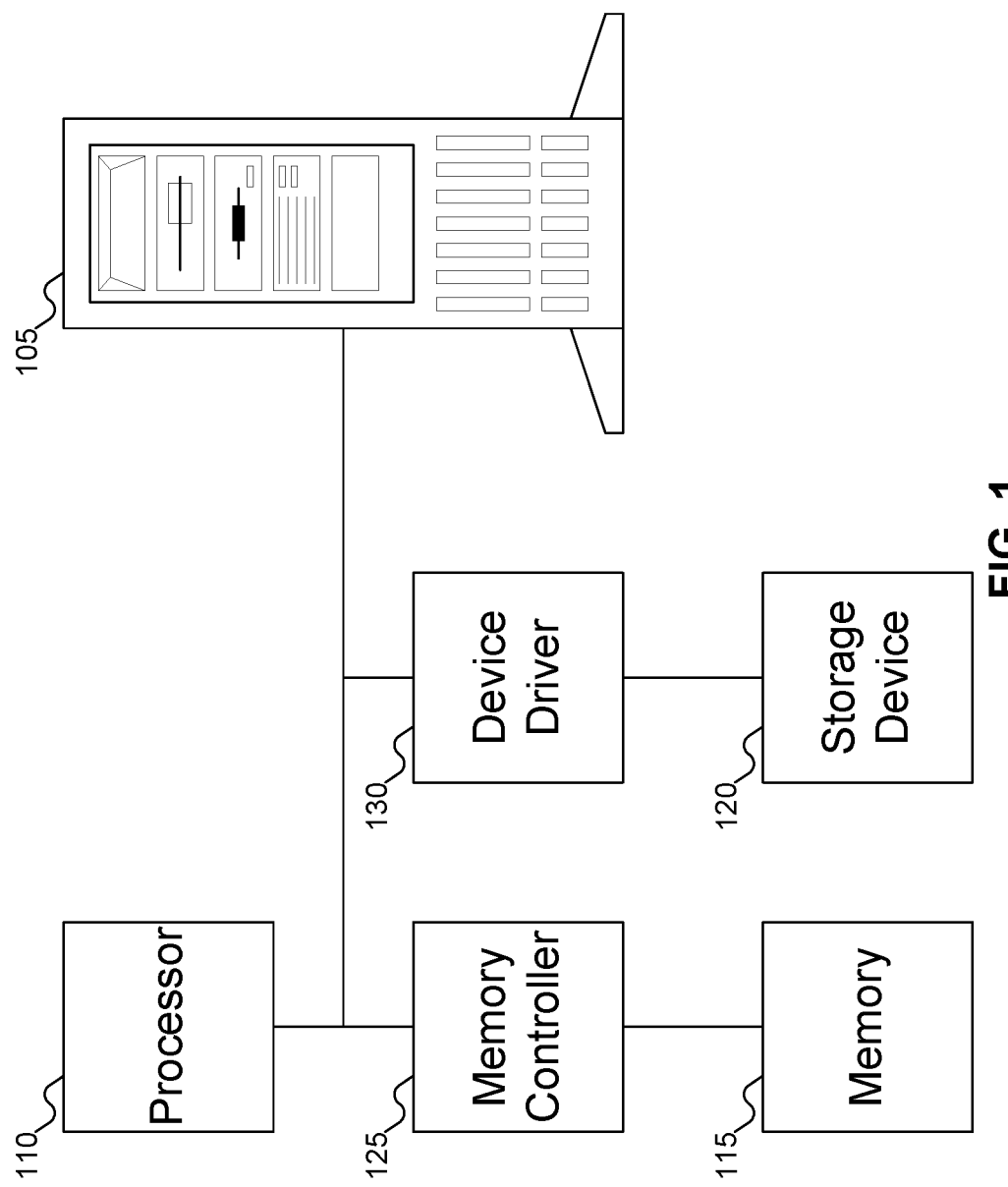
FIG. 1 shows a machine operative to use dedupable memory, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

In a conventional Hash Table, the Hash Table is of size m×n, where m is the number hash buckets (or rows), and n is the number ways (or columns). For example, a Hash Table might have $2^m=2^{26}$ hash buckets and $2^n=2^5$ ways.

When the conventional Hash Table grows, the increment of the Hash Table size is double its current size (as N increments the exponent, which doubles that dimension of the Hash Table). The number of hash buckets does not change, only the number of ways. Thus, depending on the available memory capacity and the size of the Hash Table, it may not be possible to double the size of the Hash Table. This fact might leave a big portion of memory that may not be deduped, which would be used as an Overflow Region.

Herein, a scalable Hash Table may contain a Big Hash Table (BHT), which is the conventional Hash Table, and a Little Hash Table (LHT) which has the same number of hash buckets but has a smaller number of ways. So, for example, if $2^m=2^{26}$ and $2^n=2^5$ (or alternatively, m=26 and n=5) for the Big Hash Table, the size of the Little Hash Table may be $2^m=2^{26}$ and $2^{n'}$, where n' may be any number between 1 and n−1. The scalable Hash Table enables the flexibility to adjust the Hash Table size with a finer granularity to maximize the dedupable memory size and to achieve high dedupe ratio. Note that the names "Big Hash Table" and "Little Hash Table" are merely to clarify which hash table is being referenced. The hash tables could just as easily have been named "first hash table" and "second hash table" without losing any functionality.

The mapping of a logical address to the physical memory (also known as Physical Line ID, or PLID) is managed by the Translation Table. The user data (also known as the Physical Line or PL) is stored in one of the Big Hash Table, the Little Hash Table, or the Overflow Region.

A Translation Table entry includes a Region, indicating whether user data may be found in the Big Hash Table or in one of the Little Hash Table or the Overflow Region. Thus, for example, if the Region stores the value 0, the user data may be found in the Big Hash Table; otherwise, the user data may be found in either the Little Hash Table or the Overflow Region.

If the user data is not stored in the Big Hash Table the Translation Table entry may also include a Subregion, indicating which of the Little Hash Table and the Overflow Region stores the user data. Thus, for example, if the Subregion stores the value 0, the user data may be found in the Little Hash Table; otherwise, the user data may be found in the Overflow Region.

FIG. 1 shows a machine operative to use dedupable memory, according to an embodiment of the inventive concept. In FIG. 1, machine 105 is shown. Machine 105 may be any desired machine, including without limitation a desktop or laptop computer, a server (either a standalone server or a rack server), or any other device that may benefit from embodiments of the inventive concept. Machine 105 may also include specialized portable computing devices, tablet computers, smartphones, and other computing devices. Machine 105 may run any desired applications: database applications are a good example, but embodiments of the inventive concept may extend to any desired application.

Machine 105, regardless of its specific form, may include processor 110, memory 115, and storage device 120. Processor 110 may be any variety of processor: for example, an Intel Xeon, Celeron, Itanium, or Atom processor, an AMD Opteron processor, an ARM processor, etc. While FIG. 1 shows a single processor, machine 105 may include any number of processors, each of which may be single core or multi-core processors. Memory 115 may be any variety of memory, such as flash memory, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Memory 115 may be controlled by memory controller 125, also part of machine 105.

Storage device 120 may be any variety of storage device. Storage device 120 may be controlled by device driver 130, which may reside within memory 115.

Figure 2:
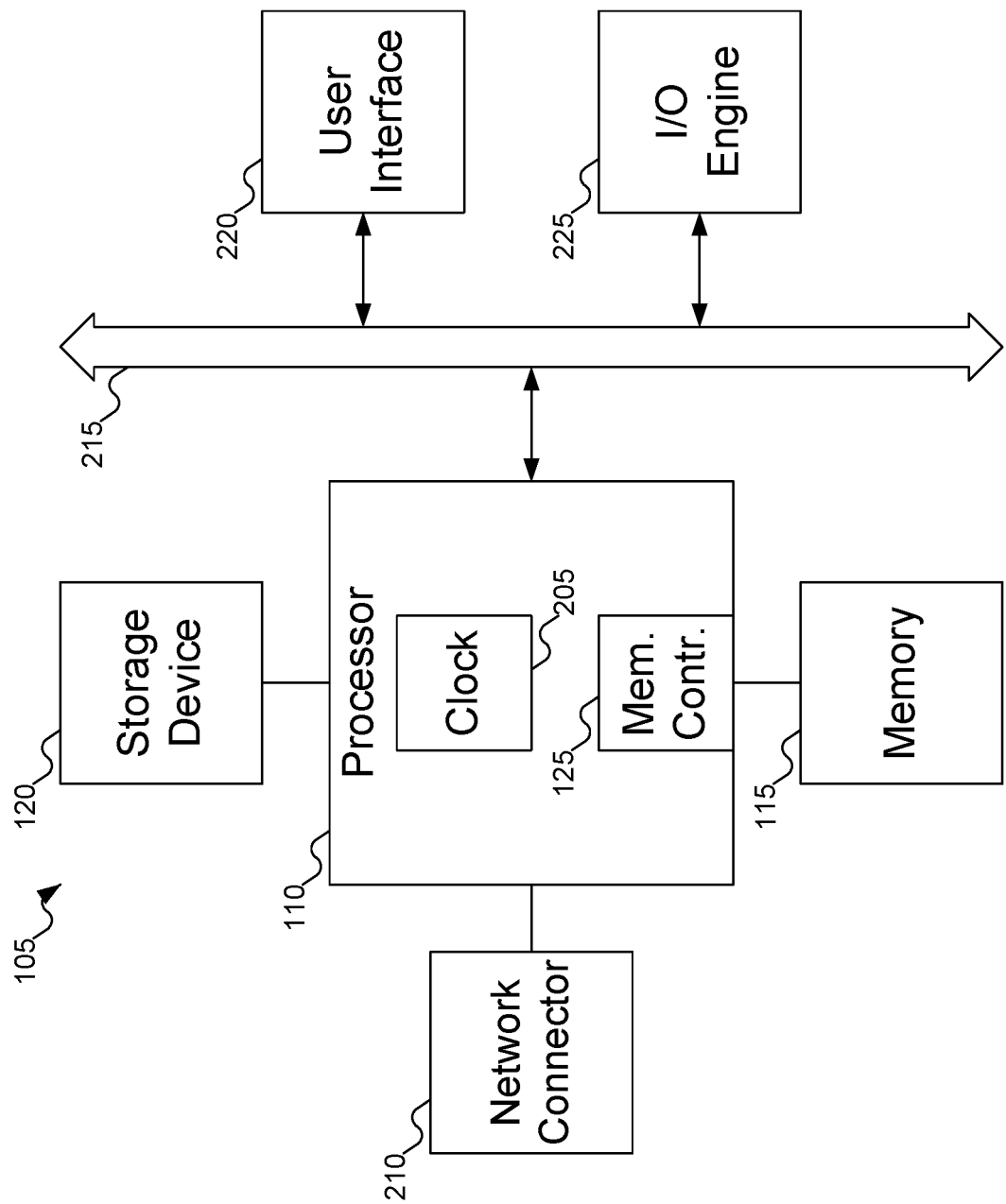
FIG. 2 shows additional details of the machine of FIG. 1.

FIG. 2 shows additional details of machine 105 of FIG. 1. Referring to FIG. 2, typically, machine 105 includes one or more processors 110, which may include memory controller 125 and clock 205, which may be used to coordinate the operations of the components of machine 105. Processors 110 may also be coupled to memory 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to a bus 215, to which may be attached user interface 220 and Input/Output interface ports that may be managed using Input/Output engine 225, among other components.

In FIGS. 1-2, memory 115 may be a dedupable memory. While the implementation of dedupable memory may vary from more traditional forms of memory, such as Dynamic Random Access Memory (DRAM), these differences may not be relevant to the implementation of dedupable memory. Furthermore, whether other hardware components of machine 105, such as processor 110, are aware of the specific implementation of memory 115 may depend on whether those components need to know the physical structure of memory 115. This "lack of knowledge" about the specific implementation of memory 115 may also extend to software elements, such as application programs running on machine 115. Application programs might send read and write requests to memory 115 without any knowledge of whether memory 115 includes DRAM, dedupable memory, or any other form of memory.

Figure 3:
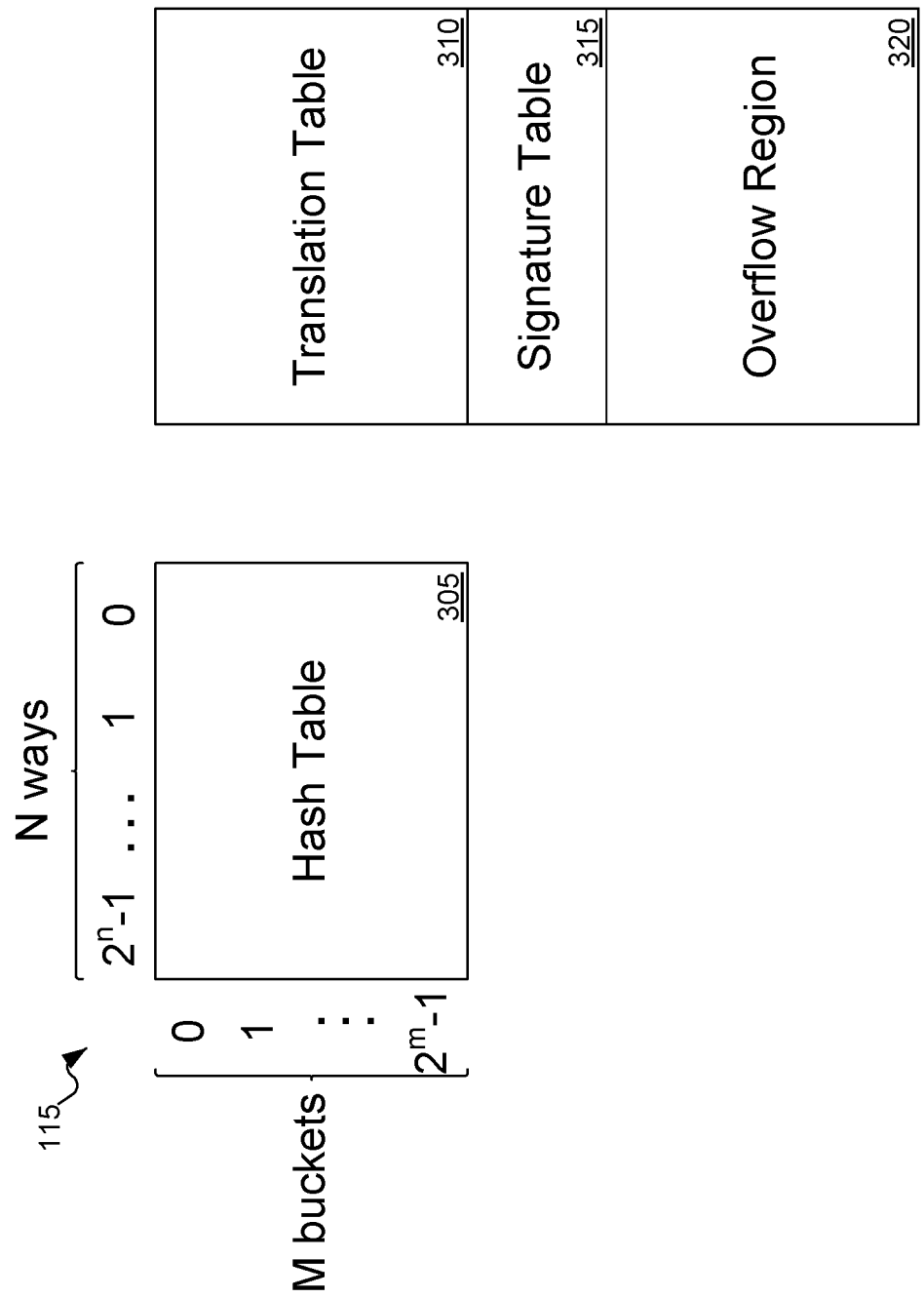
FIG. 3 shows the use of a conventional Hash Table for dedupable memory in the machine of FIG. 1.

FIG. 3 shows the use of a conventional Hash Table for dedupable memory in the machine of FIG. 1, as described in parent U.S. patent application Ser. No. 15/498,371, filed Apr. 26, 2017 and published as U.S. Patent Publication No. 2017/0286010 on Oct. 5, 2017, which is incorporated by reference herein for all purposes. In FIG. 3, memory 115 may include Hash Table 305, Translation Table 310, signature table 315, and Overflow Region 320. Hash Table 305 may be organized to include $2^m$ rows or buckets, and $2^n$ ways or columns. Hash Table 305 may be used to store the user data, with each user data stored in a particular way within a particular hash bucket. While the presentation of FIG. 3 suggests that Hash Table 305 is approximately ⅓ of the total memory, in practice Hash Table 305 may be of any size, and often will be as large as possible to fit within the available memory (to maximize dedupable memory). Overflow Region 320 represents a part of memory 115 that may not be used as dedupable memory (because there is more memory than may be used by Hash Table 305, but not enough additional memory to support doubling the number of ways in Hash Table 305).

Figure 4:
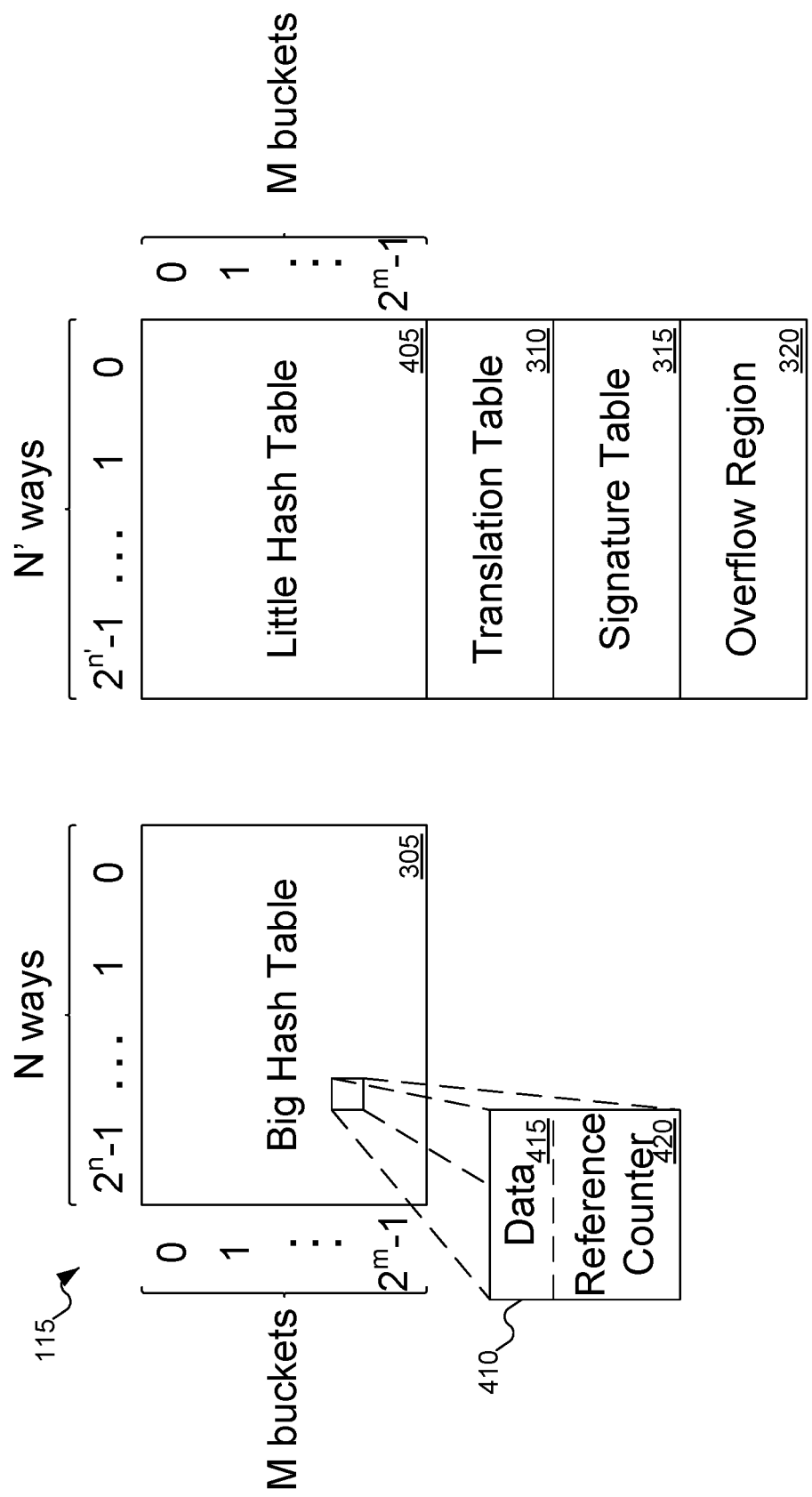
FIGS. 4-5 show the use of a scalable Hash Table, according to embodiments of the inventive concept.

FIG. 4 shows the use of a scalable Hash Table, according to embodiments of the inventive concept. In contrast to FIG. 3, FIG. 4 includes Big Hash Table 305, Translation Table 310, signature table 315, Overflow Region 320, and Little Hash Table 405. Little Hash Table 405, like Big Hash Table 305, includes $2^m$ buckets. But Little Hash Table includes $2^{N'}$ ways, where n' is smaller than n. In some embodiments of the inventive concept, n' may vary, permitting Little Hash Table 405 to grow dynamically over time. Thus, for example, n' may start at 0 or 1 (depending on the implementation), and when the Little Hash Table is sufficiently full that new entries may not be placed in their buckets, n' may be increased by one. Little Hash Table 405 may also dynamically shrink: for example, if memory 115 is performing relatively little deduplication. In other embodiments of the inventive concept, Little Hash Table 405 may be established statically (likely as large as it may be within the memory).

For given row and column values in either Big Hash Table 305 or Little Hash Table 405, the hash table may include an entry, such as entry 410. Entry 410 may include data 415 and frequency counter 420. Data 415 stores the actual data; frequency counter 420 tracks the number of different references to the data. As applications express interest in using data 415, frequency counter 420 may be increased; when applications are no longer interested in data 415, frequency counter 420 may be decreased.

Note that n' should not be larger than n. After all, if the memory includes sufficient space for n' to grow as large as n, then Big Hash Table 305 could have been made twice as large to begin with, and there would be no need to use Little Hash Table 405.

The above discussion suggests that Big Hash Table 305 is established statically, regardless of whether Little Hash Table 405 is static or dynamic. While in some embodiments of the inventive concept Big Hash Table 305 may be established statically, in other embodiments of the inventive concept Big Hash Table 305 may grow dynamically as needed (until it may grow no more within the confines of the physical memory). In addition, there is no required relationship between whether Big Hash Table 305 and Little Hash Table 405: they each could be static or dynamic. That is, both tables may be static, one may be static and the other dynamic, or both may be dynamic.

Note that by using both Big Hash Table 305 and Little Hash Table 405, more of memory 115 is used for dedupable memory, and less is assigned to Overflow Region 320. This may improve the use of memory 115, reducing the required dedup ratio for deduplication to be effective.

Some examples may be helpful. Consider the situation where Big Hash Table 305 has 32 ($2^5$) ways, and Little Hash Table 405 has 16 ($2^4$) ways, with total memory capacity of 274,877,906,944 bytes (approximately 256 GB). Table 1 below shows relevant data about the use of the Hash Tables, comparing the use of Hash Table 305 by itself vs. using both Big Hash Table 305 and Little Hash Table 405. As may be seen, to achieve an effective deduplication ratio of 3.0, the raw deduplication ratio required for Hash Table 305 by itself is 5.4: that is, roughly 5.4% of the data stored in memory 115 must represent duplicated data to achieve the effective deduplication ratio of 3.0. In contrast, when both Big Hash Table 305 and Little Hash Table 405 are used together, a raw deduplication ratio of only 3.9 is needed to achieve the effective deduplication ratio of 3.0: a considerable improvement.

TABLE 1

| Memory Size and Parameters | Regular Hash Table Memory 0 | Using Big & Little Hash Tables | |
|---|---|---|---|
| | | Memory 0 | Memory 1 |
| DDUP_CL_BITS | 6 | 6 | 6 |
| DDUP_N_BITS | 5 | 5 | 4 |
| DDUP_M_BITS | 26 | 26 | 26 |
| DDUP_SIG_FUNC (CRC ##) | 16 | 16 | 16 |
| Physical Memory Size | 274,877,906,944 | 137,438,953,472 | 137,438,953,472 |
| DDUP Ratio | 3.0 | 3.0 | 3.0 |
| RAW DDUP Ratio Required | 5.4 | 3.9 | |
| VM Memory Size | 824,633,720,832 | 412,316,860,416 | 412,316,860,416 |
| HT Table Entries | 2,147,483,648 | 2,147,483,648 | 1,073,741,824 |
| HT Memory Size | 137,438,953,472 | 137,438,953,472 | 68,719,476,736 |
| SIG Entry Size (bit) | 16 | 0 | 16 |
| SIG Memory Size | 4,294,967,296 | 0 | 6,442,450,944 |
| RC Entry Size (bit) | 0 | 0 | 0 |
| RC Memory Size | 0 | 0 | 0 |
| TT Table Entries | 12,884,901,888 | 0 | 12,884,901,888 |
| TT Entry Size (bit) | 32 | 0 | 32 |
| TT Memory Size | 51,539,607,552 | 0 | 51,539,607,552 |
| OV Memory Size | 81,604,378,624 | 0 | 10,737,418,240 |
| Dedupable Size Increased | | 50% | |

The reason why a lower raw deduplication ratio is needed when using both Big Hash Table 305 and Little Hash Table 405 is because more of memory 115 is used as dedupable memory: that is, Overflow Region 320 is smaller. With less of memory 115 being used for Overflow Region 320, a lower raw deduplication ratio is needed, as memory 115 is overall used more effectively.

As a second example, consider the same Hash Tables in the same physical memory, but look at the effective deduplication ratio assuming a constant raw deduplication ratio. Table 2 illustrates this situation. As may be seen, the effective deduplication ratio when Hash Table 305 is used alone is lower than the effective deduplication ratio when both Big Hash Table 305 and Little Hash Table 405 are used together.

TABLE 2

| Memory Size and Parameters | Regular Hash Table Memory 0 | Using Big & Little Hash Tables Memory 0 | Using Big & Little Hash Tables Memory 1 |
|---|---|---|---|
| DDUP_CL_BITS | 6 | 6 | 6 |
| DDUP_N_BITS | 5 | 5 | 4 |
| DDUP_M_BITS | 26 | 26 | 26 |
| DDUP_SIG_FUNC (CRC ##) | 16 | 16 | 16 |
| Physical Memory Size | 274,877,906,944 | 137,438,953,472 | 137,438,953,472 |
| DDUP Ratio | 2.3 | 3.0 | 3.0 |
| RAW DDUP Ratio Required | 3.9 | 3.9 | |
| VM Memory Size | 632,219,185,971 | 412,316,860,416 | 412,316,860,416 |
| HT Table Entries | 2,147,483,648 | 2,147,483,648 | 1,073,741,824 |
| HT Memory Size | 137,438,953,472 | 137,438,953,472 | 68,719,476,736 |
| SIG Entry Size (bit) | 16 | 0 | 16 |
| SIG Memory Size | 4,294,967,296 | 0 | 6,442,450,944 |
| RC Entry Size (bit) | 0 | 0 | 0 |
| RC Memory Size | 0 | 0 | 0 |
| TT Table Entries | 9,878,424,781 | 0 | 12,884,901,888 |
| TT Entry Size (bit) | 32 | 0 | 32 |
| TT Memory Size | 39,513,699,123 | 0 | 51,539,607,552 |
| OV Memory Size | 93,630,287,053 | 0 | 10,737,418,240 |
| Dedupable Size Increased | | 50% | |

The embodiments of the inventive concept described above show one Big Hash Table 305 and one Little Hash Table 405. But there is no reason why only one Little Hash Table 405 is used. Embodiments of the inventive concept may support multiple Little Hash Tables, at the cost of decreasing returns on investment. For example, in FIG. 5 memory 115 is shown as including Big Hash Table 305, Little Hash Table 405, and Little Hash Table 505. Little Hash Table 505 is identical in form and function to Little Hash Table 405, except that Little Hash Table 505 includes N" ways, where N" is some power of two less than N' (just like N' is a power of two less than N).

Figure 6:
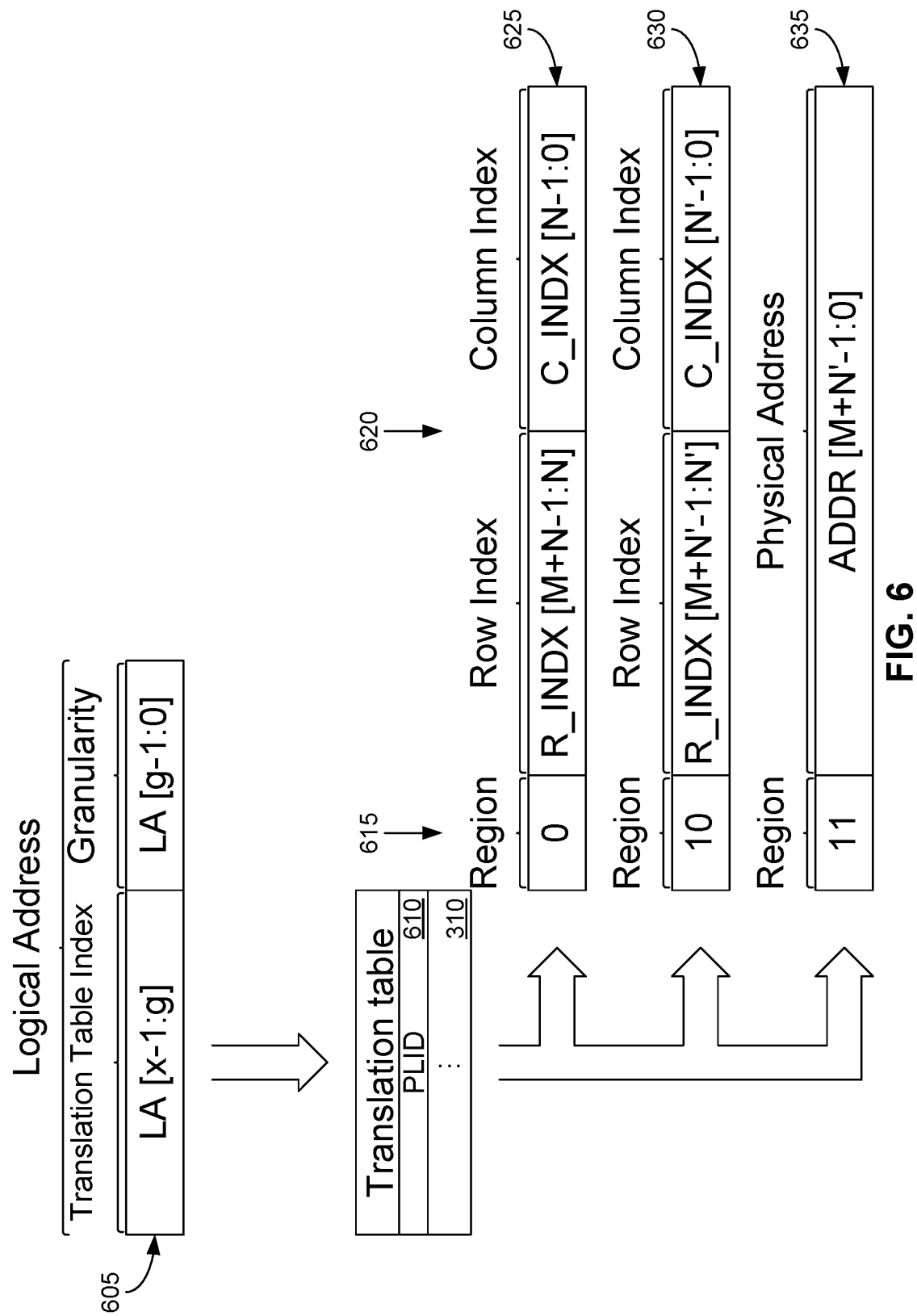
FIG. 6 shows the use of the Translation Table of FIG. 4 to map logical addresses to various memory destinations.

Translation Table 310 is responsible for mapping a logical address to the address where the desired user data is stored. As such, Translation Table 310 may store the row and column (or, alternatively, the bucket and way) in the Hash Tables where the user data is stored (if the user data is stored in one of the Hash Tables), or the physical address in Overflow Region 320 (if the user data is not stored in one of the Hash Tables). FIG. 6 illustrates this process.

In FIG. 6, Translation Table 310 may receive logical address 605 from the host computer (logical address 605 may ultimately come from an application, the operating system, or any other software or hardware that needs to access data from memory 115 of FIG. 1). Logical address 605 may be part of a data request, which may be either a read request or a write request. Logical address 605 may be thought of as including two elements: the Translation Table index and the granularity. The Translation Table index may represent the specific page (or cache line) in which the requested data may be found; the granularity may represent the specific byte of data to be retrieved. As such, the Translation Table index may be generated by masking out the lowest order bits from logical address 605. How many bits are masked to produce the Translation Table index may depend on the size of the Translation Table index (which in turn may depend on the size of memory 115 of FIG. 1 and the size of cache lines used in the computer system).

The Translation Table index may then be used as an index into Translation Table 310, from which Physical Line Identifier (PLID) 610 may be read. PLID 610 may take different forms, depending on where the user data is actually stored. But in all cases, PLID 610 includes region identifier 615 and physical address 620.

If the user data is stored in Big Hash Table 305 of FIG. 4, then PLID 610 may look like entry 625. In entry 625, the region identifier includes a single bit, which indicates that the user data is stored in Big Hash Table 305 of FIG. 4. The physical address then includes m bits for the row index (identifying the hash bucket) and n bits for the column index (identifying the way). Since m bits is enough to select among $2^m$ hash buckets, and n bits is enough to select among $2^n$ ways, a unique user data may be identified within Big Hash Table 305.

If the user data is stored in Little Hash Table 405 of FIG. 4, then PLID 610 may look like entry 630. In entry 630, the region identifier includes two bits: the first bit indicating that the user data is not stored in Big Hash Table 305 of FIG. 4, and the second bit indicating that the user data is stored in Little Hash Table 405 of FIG. 4. The physical address then includes m bits for the row index (identifying the hash bucket) and n' bits for the column index (identifying the way). Note that because n' is always smaller than n, entry 630 does not require more bits than entry 625, even though two bits are used to identify the region where the user data is stored.

If the user data is stored in Overflow Region 320 of FIG. 4, then PLID 610 may look like entry 635. In entry 635, the region identifier again includes two bits: the first bit indicating that the user data is not stored in Big Hash Table 305 of FIG. 4, and the second bit indicating that the user data is stored in Overflow Region 320 of FIG. 4. The physical address may be formatted in any desired manner, including row and column indices (like entries 625 and 630), or using any other desired format.

Figure 5:
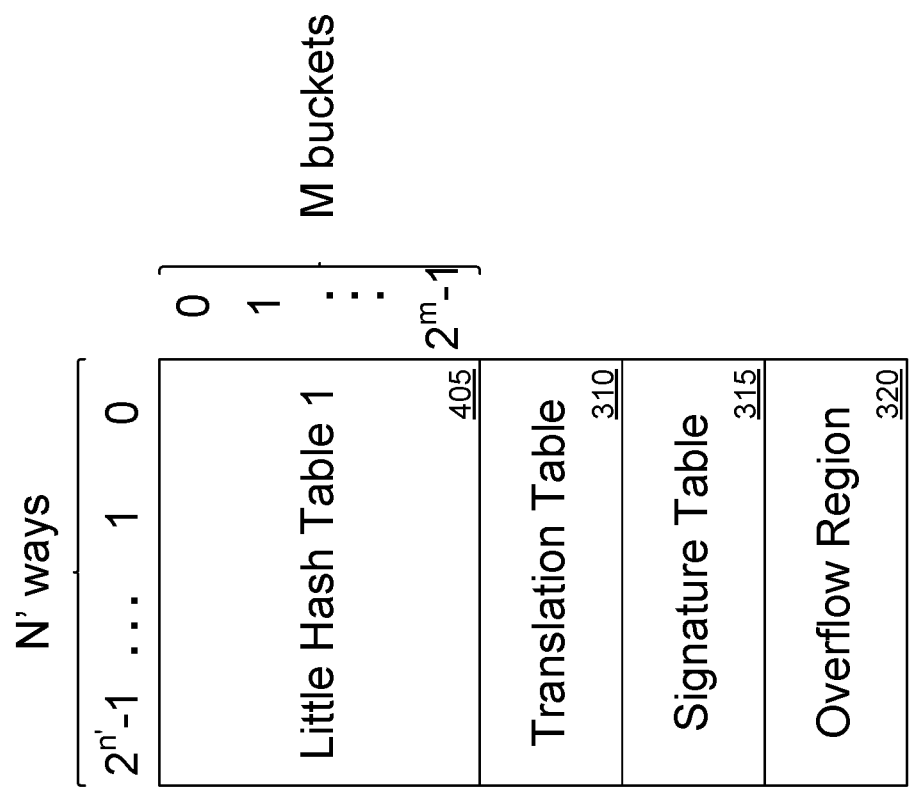
Figure 5:
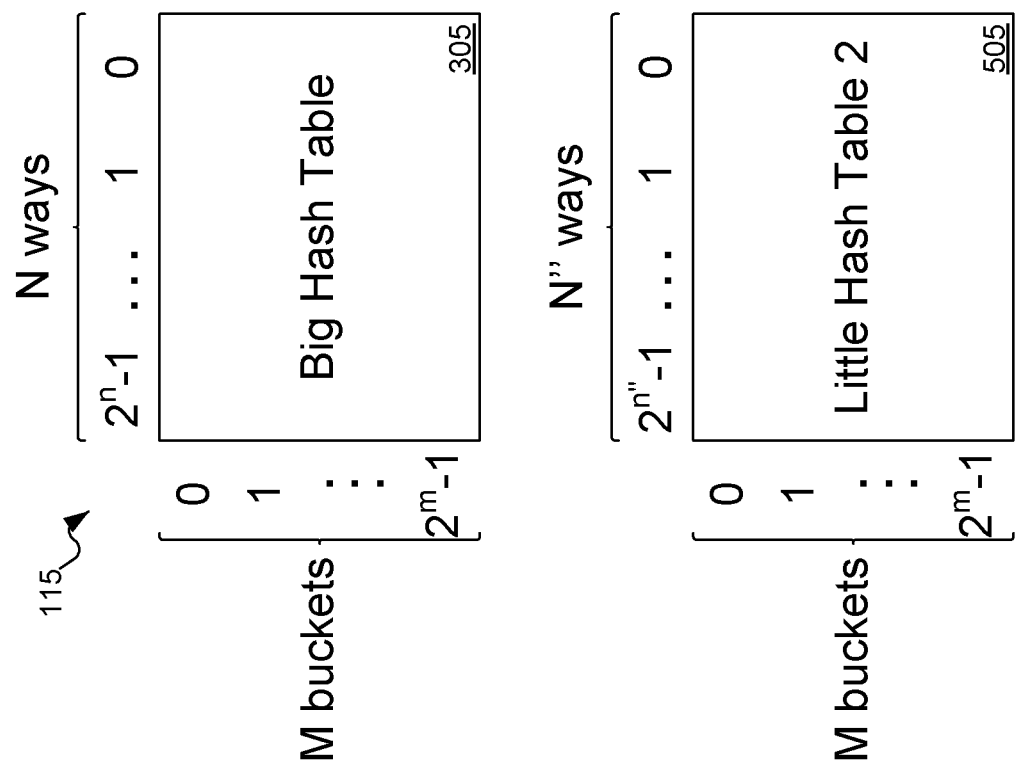

While entries 625, 630, and 635 show how to differentiate between entries in Big Hash Table 305 of FIG. 4, Little Hash Table 405 of FIG. 4, and Overflow Region 320 of FIG. 4, embodiments of the inventive concept may support other forms used. For example, in embodiments of the inventive concept including multiple Little Hash Tables 405 and 505 as shown in FIG. 5, Region 615 might include one bit to differentiate between Big Hash Table 305 of FIG. 5 and the other regions, and then use two bits to select among Little Hash Tables 405 and 505 of FIG. 5 and Overflow Region 320 of FIG. 5. Alternatively, Region 615 might always use two bits to select among up to four different regions, or always use three bits to select among up to eight different regions, and so on. This approach has the advantage of not needing a variable number of bits to select the region, but would need variable numbers of bits to store the entire PLID, and would leave some combination of bits for Region 615 unused.

Note that while FIG. 6 described Translation Table 310 as a table, with entries keyed off a number of bits from the logical address, it is also possible for Translation Table 310 to be implemented using other techniques: for example, using a hash function. When using a hash function, a particular logical address (or the relevant high-order bits of the logical address) may be subject to a hash function. The result of the hash function may then be used to determine the location (Big Hash Table 305 of FIG. 4, Little Hash Table 405 of FIG. 4, or Overflow Region 320 of FIG. 4) and the physical address of the user data.

Returning to FIG. 4, one issue when using dedupable memory is checking to see if the user data is actually stored somewhere in memory 115. For example, different applications might request access to the same data, but using different logical addresses (as neither application might be aware of the other application or the other application's interest in the user data). Signature table 315 may be used to help determine whether a given user data is a duplicate of some other user data already present in memory 115, and prevent redundant copies of the user data from being stored.

When user data is to be newly stored in memory 115, a hash function may be applied to the user data to generate a signature. This hash function may be the same hash function as might be used to determine where user data is actually stored in memory 115, or it may be a different hash function. Unlike the hash function that may be used to determine where the user data is to be stored, the hash function that is used to generate the signature performs a hash of the user data itself, rather than the logical address of the user data. Signature table 315 may then be searched to see if the signature is present.

Note that the signature will usually be shorter in length (i.e., fewer bits) than the user data itself. Thus, it is possible for different user data to generate the same signature. In other words, if a match for the signature is found in signature table 315, that match does not automatically mean that the user data is already stored in memory 115. To determine whether the user data is actually stored in memory 115, the user data is compared with the identified data in memory 115: if the complete comparison indicates a match, then the user data has already been stored in memory 115. In that case, Translation Table 310 may be set to have PLID 610 of FIG. 6 point to the location where the user data is stored. Note that the inverse proposition is true: if no match for the signature is found in signature table 315, then the user data is not already stored in memory 115 (since the same data will not produce different signatures using the same hash function). In that case, a new entry may be added to signature table 315 that may be mapped back to the logical address.

Signature table 315 is typically used only with reference to user data stored in Big Hash Table 305 and Little Hash Table 405. That is, signature table 315 is not used for data stored in Overflow Region 320. The reason is simple: Overflow Region 320 is not subject to deduplication, and therefore duplicate data may be stored there.

Figure 7A:
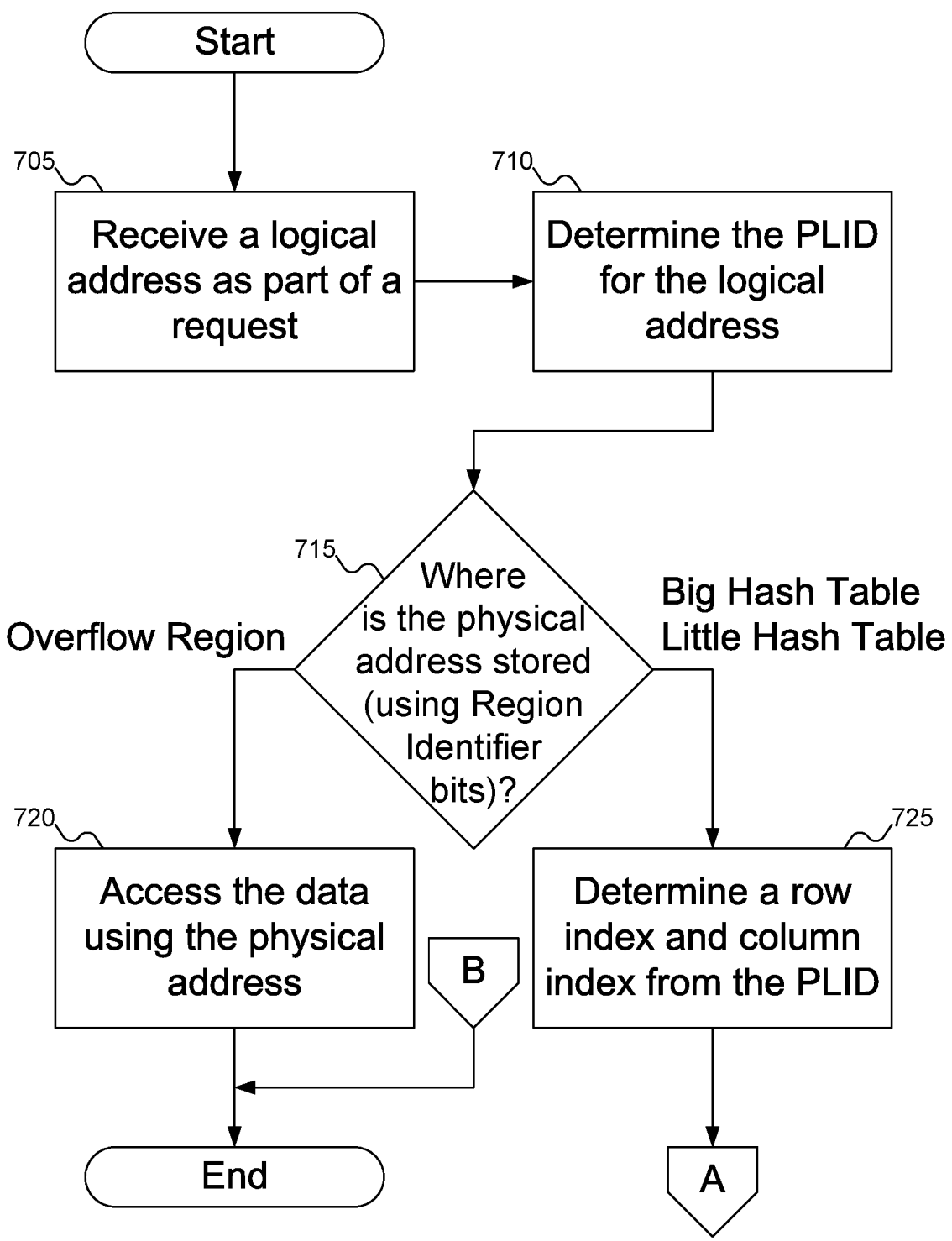
FIGS. 7A-7B show a flowchart of an example procedure to use the scalable Hash Table of FIG. 4 with dedupable memory, according to an embodiment of the inventive concept.
Figure 7B:
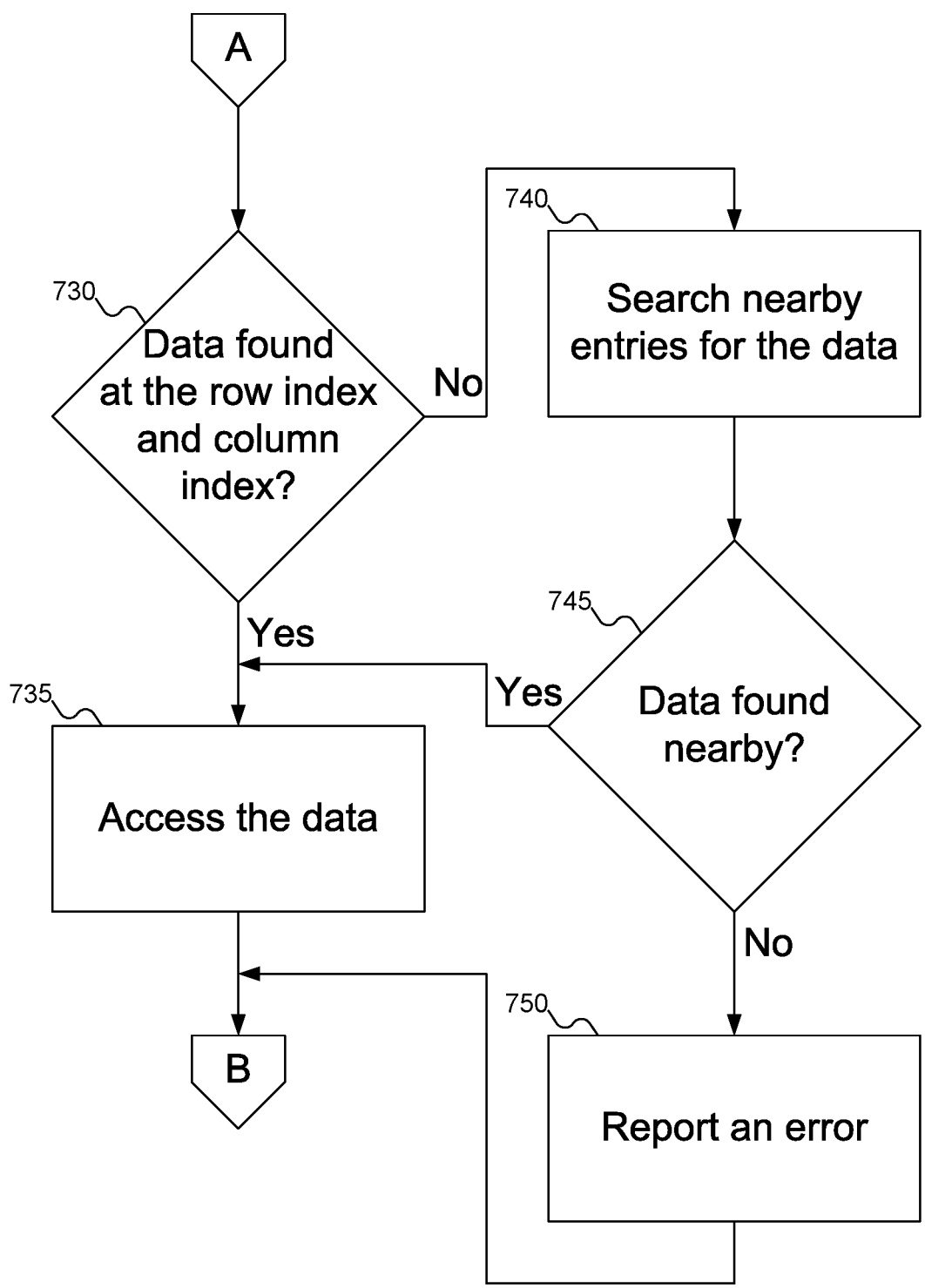

FIGS. 7A-7B show a flowchart of an example procedure to use the scalable Hash Table of FIG. 4 with dedupable memory, according to an embodiment of the inventive concept. In FIG. 7A, at block 705, memory 115 of FIG. 4 may receive logical address 605 of FIG. 6 from machine 105 of FIG. 1 (be it from an application running on machine 105, the operating system, or some other component), as part of a data request. At block 710, memory 115 of FIG. 4 may determine PLID 610 of FIG. 6 corresponding to logical address 605 of FIG. 6. Note that how PLID 610 of FIG. 6 is determined depends on whether data is being read or written, since different approaches are used to determine PLID 610 of FIG. 6 in these cases. Flowcharts of how PLID 610 of FIG. 6 is determined for read and write requests are shown below with reference to FIGS. 8 and 9A-9C, respectively.

Once PLID 610 of FIG. 6 is determined, then at block 715 memory 115 of FIG. 4 uses the region identifier of PLID 610 of FIG. 6 to determine where the data is stored. If the data is stored in Overflow Region 320 of FIG. 4, then at block 720 the user data is accessed (which may be either reading the data from Overflow Region 320 of FIG. 4 or writing the data to Overflow Region 320 of FIG. 4, depending on the type of request issued) using the physical address from PLID 610 of FIG. 6, after which processing ends. Otherwise, at block 725, memory 115 of FIG. 4 determines the row index and column index (that is, the hash bucket and way) in either Big Hash Table 305 of FIG. 4 or Little Hash Table 405 of FIG. 4 (except for where the hash tables are stored in memory 115 of FIG. 4, the access of the data is the same).

At block 730 (FIG. 7B), memory 115 of FIG. 4 determines whether the requested data may be "found" at the specified row index and column index. For example, when data is to be written to one of the hash tables, it might occur that the row index and column index identify a location that is already occupied with data (an unlikely but possible occurrence). In that case, the user data may be written to a nearby location (for example, another way in the same hash bucket, within some predetermined delta from the column index), and therefore would need to be retrieved from that location instead when read. What is considered "nearby" in the hash table is discussed further below with reference to FIGS. 9A-9C. Note that in the case of a write request, the data being "found" is intended to mean that there is an available entry in the hash table where the data may be written.

Note that in the situation where logical address 605 of FIG. 6 is part of a read request, memory 115 of FIG. 4 may have no way to determine that the data at the specified row index and column index is not the requested data. In such situations, block 730 would typically always return a "yes" result and transition automatically to block 735 to access the data.

If the data is found at the specified row index and column index, or if the specified row index and column index is available to store data for a write request, then at block 735 memory 115 of FIG. 4 may access the data, after which processing is complete. Otherwise, if data is to be written but the row index and column index identify a location that already stores data, then at block 740 memory 115 of FIG. 4 may search nearby entries for a location to write user data. If, at block 745, there is no nearby location where user data may be written, then at block 750 memory 115 of FIG. 4 may report an error. Alternatively, and particularly in the case where data was to be written to one of the hash tables but could not for some reason, PLID 610 of FIG. 6 may be changed to point to Overflow Region 320 of FIG. 4 instead of the hash tables (in which case processing could continue with block 720 of FIG. 7A). Otherwise, the data was "found" nearby, and at block 735 the user data may be accessed from the hash table, and processing is complete.

Figure 8:
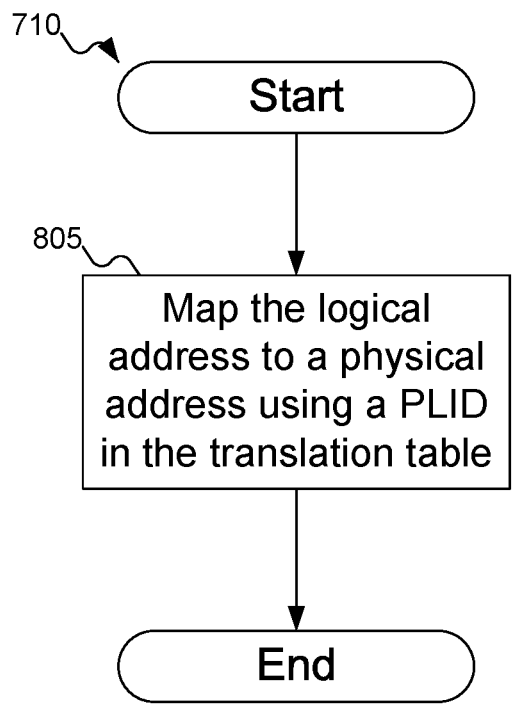
FIG. 8 shows a flowchart of an example procedure for determining a Physical Line Identifier (PLID) for a logical address in a read request in the memory of FIG. 4, according to an embodiment of the inventive concept.

FIG. 8 shows a flowchart of an example procedure for determining Physical Line Identifier (PLID) 610 of FIG. 6 for a logical address in a read request in memory 115 of FIG. 4, according to an embodiment of the inventive concept. In the case of a read request, the process is simple. At block 805, the logical address is used to access Translation Table 310 of FIG. 4. Translation Table 310 may then provide PLID 610 of FIG. 6, from which a physical address (which might include a row index and column index into one of the hash tables) may be determined that may be used to access the data from the appropriate region in memory 115 of FIG. 4.

Figure 9A:
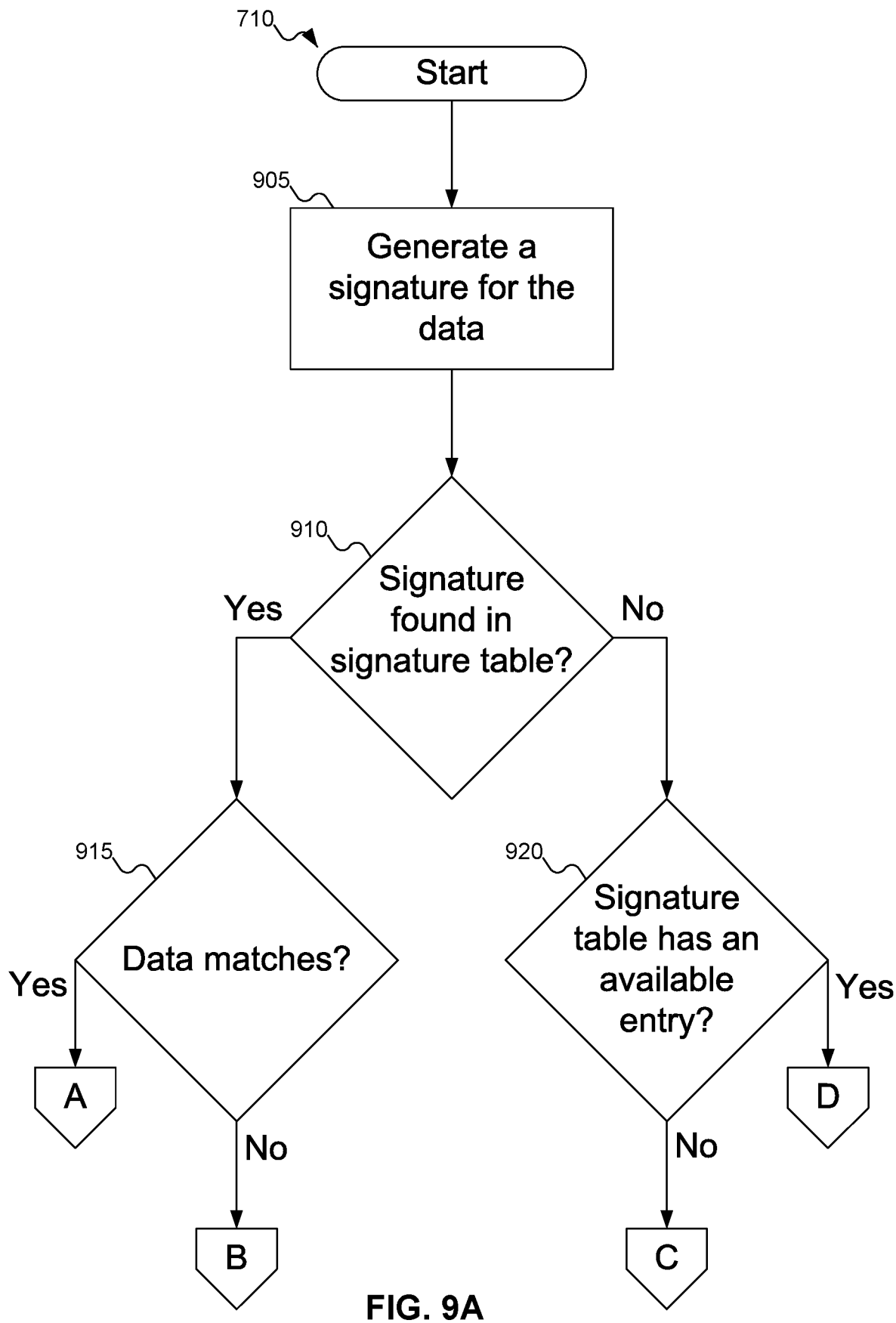
FIGS. 9A-9C show a flowchart of an example procedure for determining a Physical Line Identifier (PLID) for a logical address in a write request in the memory of FIG. 4, according to an embodiment of the inventive concept.
Figure 9B:
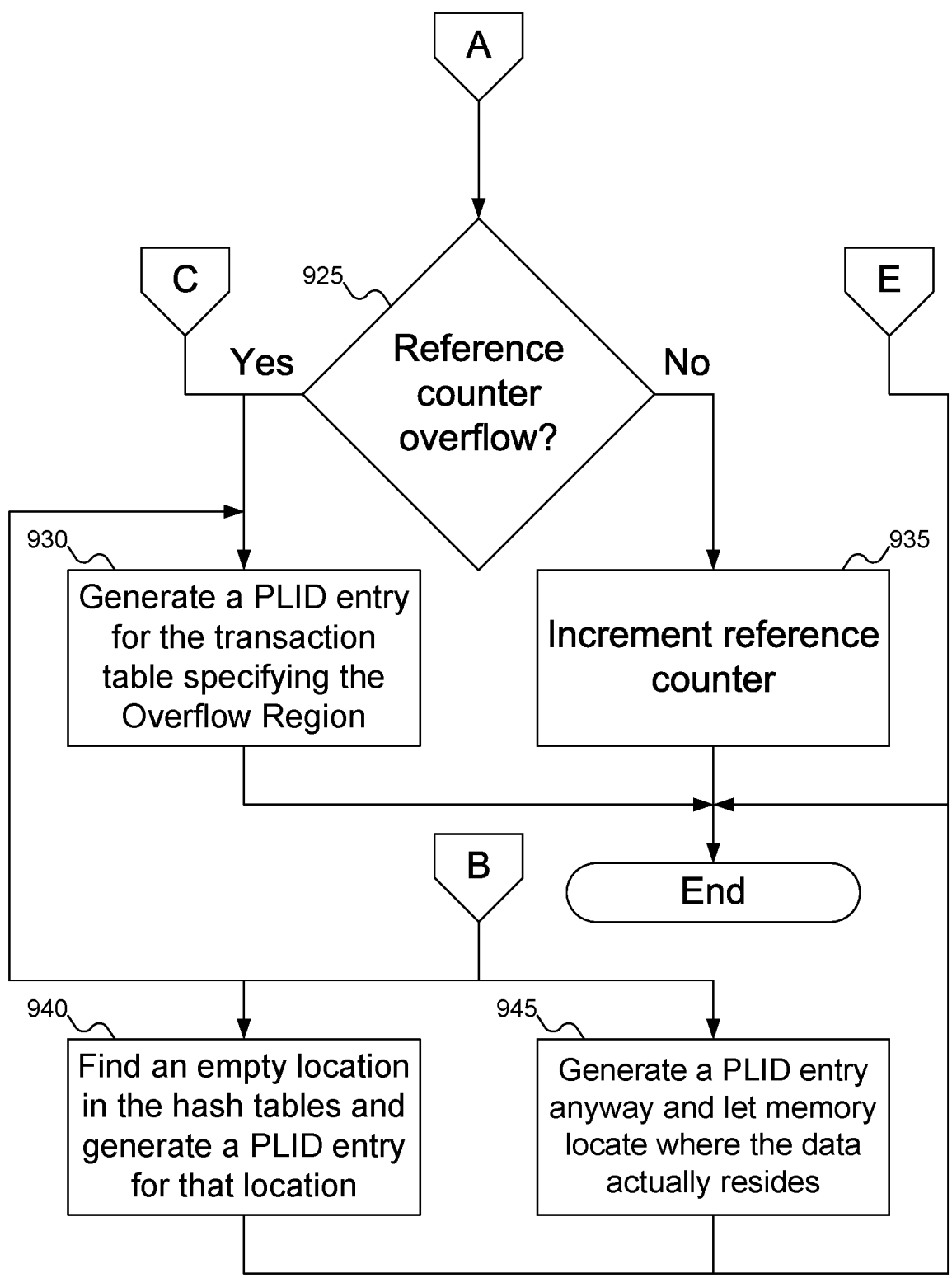
Figure 9C:
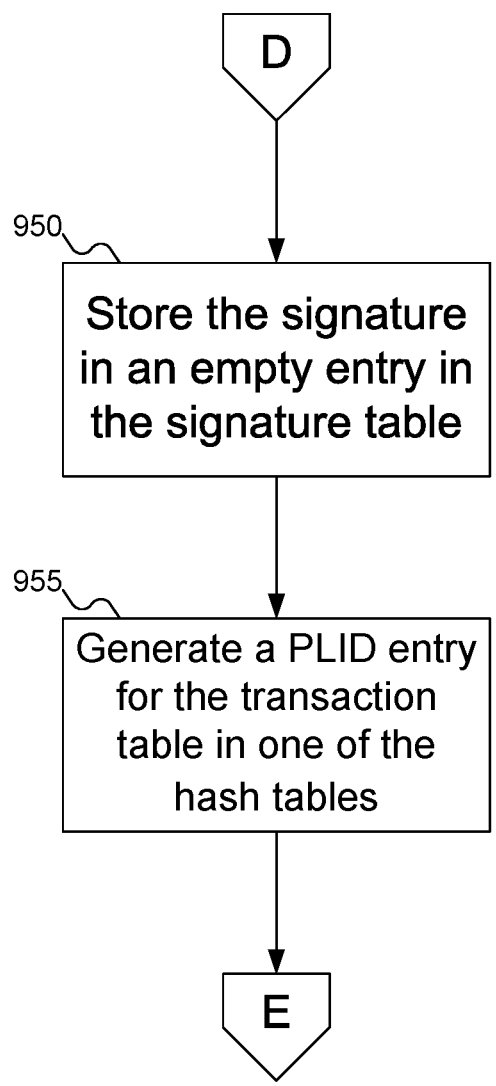

FIGS. 9A-9C show a flowchart of an example procedure for determining Physical Line Identifier (PLID) 610 of FIG. 6 for a logical address in a write request in memory 115 of FIG. 4, according to an embodiment of the inventive concept. In FIG. 9A, at block 905, memory 115 of FIG. 4 may generate a signature of the data being written. At block 910, signature table 315 of FIG. 4 may check to see if the signature is present. If a match for the signature is found, then at block 915 memory 115 of FIG. 4 may check to see if the data matches that stored in the hash table (which might be either Big Hash Table 305 of FIG. 4 or Little Hash Table 405 of FIG. 4); otherwise, at block 920 memory 115 of FIG. 4 may check to see if signature table 315 of FIG. 4 has space for a new entry.

If at block 915 the data matched that stored in the hash table, then at block 925 (FIG. 9B), memory 115 of FIG. 4 may check to see if reference counter 420 of FIG. 4 would overflow if incremented (which might happen if reference counter 420 of FIG. 4 has already reached its maximum value). If so, or if the signature table does not have room for a new entry at block 920 of FIG. 9A, then the user data should be written to Overflow Region 320 of FIG. 4, and at block 930 memory 115 generates PLID 610 of FIG. 6 for Overflow Region 320 of FIG. 4. Alternatively, if the signature is found in signature table 315 of FIG. 4, the data matches the entry in the hash table, and reference counter 420 of FIG. 4 would not overflow, then at block 935 memory 115 of FIG. 4 may increment reference counter 420 of FIG. 4, after which processing may end. Note that if reference counter 420 of FIG. 4 may be incremented without overflowing, then the data does not need to be written to memory 115 of FIG. 4 at all (it is already stored in the hash table), so the processing in FIG. 7A would also end.

If the signature was found in signature table 315 of FIG. 4, but the data did not match at block 915, then the specific combination of hash bucket and way to which the logical address might normally map is already occupied. This situation is termed a "hash collision". When a hash collision occurs, there are several ways to respond. As shown at block 940, one possibility is to find a new available location in the hash table and update PLID 610 of FIG. 6 to point to the new location. A second possibility is to direct control to block 930 and write the data to Overflow Region 320 of FIG. 4 rather than the hash table, again updating PLID 610 of FIG. 6 accordingly. A third possibility, as shown at block 945, is to leave PLID 610 of FIG. 6 unchanged, and leave it to memory 115 of FIG. 4 to figure out that the data is actually stored somewhere else. For example, there are conventional solutions to hash collisions, such as open addressing, where the data is not stored at the exact location identified but may be stored somewhere thereafter, in the first location after the hash collision that is empty. When using open addressing, the data might be stored in any address after the location identified by PLID 610 of FIG. 6, or the data might be stored within a fixed predetermined number of locations (the fixed predetermined number may be set to any desired value). In yet other embodiments of the inventive concept, the data might even be stored before the location specified by PLID 610 of FIG. 6, again possibly within some fixed predetermined number of locations. Whatever approach is used, memory 115 of FIG. 4 may use this approach both to generate PLID 610 of FIG. 6 and to access the data from the location specified by PLID 610 of FIG. 6. Embodiments of the inventive concept may also support other solutions to hash collisions.

If the signature is not found in signature table 315 of FIG. 4 and signature table 315 of FIG. 4 has room for a new entry, then at block 950 (FIG. 9C) the signature may be added to signature table 315 of FIG. 4, and at block 755 memory 115 may generate PLID 610 of FIG. 6 for either Big Hash Table 305 of FIG. 4 or Little Hash Table 405 of FIG. 4, depending on where an available entry may be found.

Figure 10:
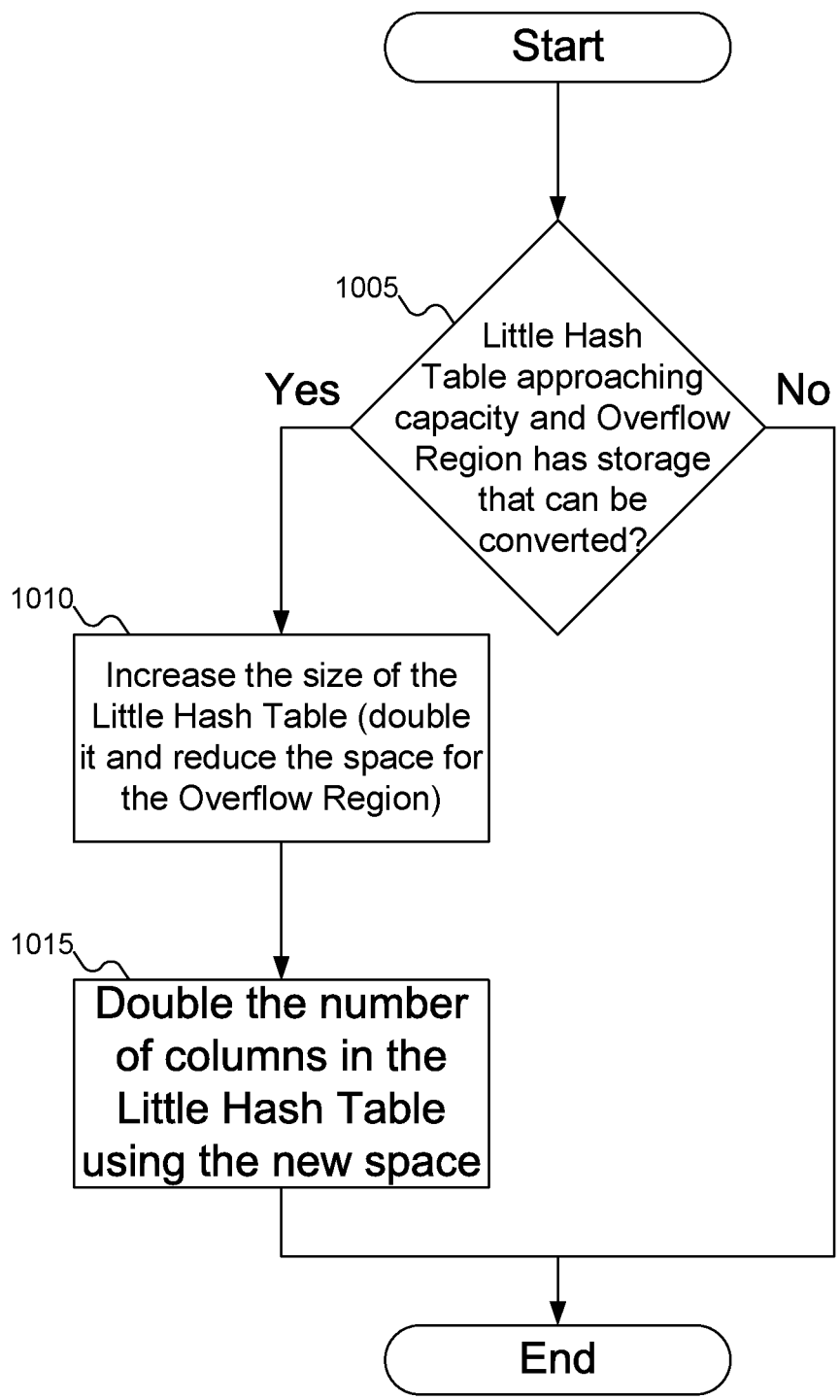
FIG. 10 shows a flowchart of an example procedure for determining whether to increase the size of the Little Hash Table of FIG. 4, according to an embodiment of the inventive concept.

FIG. 10 shows a flowchart of an example procedure for determining whether to increase the size of Little Hash Table 405 of FIG. 4, according to an embodiment of the inventive concept. In FIG. 10, at block 1005, Little Hash Table 405 of FIG. 4 may check to see if it is approaching capacity. Memory 115 of FIG. 4 may also check to see if Overflow Region 320 of FIG. 4 has enough storage available that may be repurposed for use by Little Hash Table 405 of FIG. 4. Since Little Hash Table 405 of FIG. 4 would be doubled in size, Overflow Region 320 of FIG. 4 would need to have at least as much space as Little Hash Table 405 of FIG. 4 already uses: possibly more, since some data might already be stored in Overflow Region 320 of FIG. 4 and might need to remain in Overflow Region 320 of FIG. 4. If Little Hash Table 405 of FIG. 4 has ample space, or Overflow Region 320 of FIG. 4 does not have enough storage to support increasing Little Hash Table 405 of FIG. 4, then processing may end. Otherwise (and assuming that the value n' for Little Hash Table 405 of FIG. 4 is at least two smaller than the value n for Big Hash Table 305 of FIG. 4), then at block 1010 Little Hash Table 405 of FIG. 4 may be increased in size, at the cost of decreasing the size of Overflow Region 320 of FIG. 4. Then, at block 1015, Little Hash Table 405 of FIG. 4 may double the number of ways (by incrementing the value of n') to use the newly added memory, after which processing ends.

In FIGS. 7A-10, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a memory system, comprising:
 memory to store data;
 a Big Hash Table stored in the memory, the Big Hash Table including a number of buckets and a first number of ways and including a first portion of the memory that includes a first number of bytes that is a first power of 2;
 a Little Hash Table stored in the memory, the Little Hash Table including the number of buckets and a second number of ways and including a second portion of the memory that includes a second number of bytes that is a second power of 2;
 an Overflow Region stored in the memory, the Overflow Region including a third portion of the memory; and
 a Translation Table to map a logical address to a Physical Line Identifier (PLID), the PLID including a region identifier and a physical address.

Statement 2. An embodiment of the inventive concept includes a memory system according to statement 1, wherein the region identifier includes a first bit indicating that the PLID identifies data in the Big Hash Table.

Statement 3. An embodiment of the inventive concept includes a memory system according to statement 2, wherein the physical address includes a row index and a column index.

Statement 4. An embodiment of the inventive concept includes a memory system according to statement 2, wherein:
 the first bit indicates that the PLID does not identify data in the Big Hash Table; and
 the region identifier includes a second bit indicating whether the PLID data in the Little Hash Table or the Overflow Region.

Statement 5. An embodiment of the inventive concept includes a memory system according to statement 4, wherein:
 the second bit indicates that the PLID identifies data in the Little Hash Table; and
 the physical address includes a row index and a column index.

Statement 6. An embodiment of the inventive concept includes a memory system according to statement 1, wherein the Little Hash Table may grow dynamically.

Statement 7. An embodiment of the inventive concept includes a memory system according to statement 6, wherein the Big Hash Table may grow dynamically.

Statement 8. An embodiment of the inventive concept includes a memory system according to statement 1, wherein a first effective minimum dedupe ratio for the memory system is lower a second effective minimum dedupe ratio for the Big Hash Table without the Little Hash Table.

Statement 9. An embodiment of the inventive concept includes a memory system according to statement 1, further comprising a signature table stored in the memory, the signature table storing a plurality of signatures of data stored in the Big Hash Table and the Little Hash Table,
 wherein the signature table may prevent storing multiple data with a common signature in a row in either the Big Hash Table or the Little Hash Table.

Statement 10. An embodiment of the inventive concept includes a method, comprising:
 receiving a logical address from a processor;
 mapping the logical address to a Physical Line Identifier (PLID) using a Translation Table, the PLID including a region identifier and a physical address;
 determining if the physical address is in a Big Hash Table, a Little Hash Table, or an Overflow Region in a memory using the region identifier; and
 accessing data in the memory using the physical address.

Statement 11. An embodiment of the inventive concept includes a method according to statement 10, wherein determining if the physical address is in a Big Hash Table, a Little Hash Table, or an Overflow Region in a memory using the region identifier includes determining that the physical address is in the Big Hash Table if a first bit in the region identifier is not set.

Statement 12. An embodiment of the inventive concept includes a method according to statement 10, wherein determining if the physical address is in a Big Hash Table, a Little Hash Table, or an Overflow Region in a memory using the region identifier includes determining that that the physical address is in the Little Hash Table if a first bit in the region identifier is set and a second bit in the region identifier is not set.

Statement 13. An embodiment of the inventive concept includes a method according to statement 10, wherein determining if the physical address is in a Big Hash Table, a Little Hash Table, or an Overflow Region in a memory using the region identifier includes determining that the physical address is in the Overflow Region if a first bit in the region identifier is set and a second bit in the region identifier is set.

Statement 14. An embodiment of the inventive concept includes a method according to statement 10, wherein accessing data in the memory using the physical address includes:
 determining a row index and a column index from the physical address; and
 accessing the data in one of the Big Hash Table and the Little Hash Table using the row index and the column index.

Statement 15. An embodiment of the inventive concept includes a method according to statement 14, wherein accessing the data in one of the Big Hash Table and the Little Hash Table using the row index and the column index includes searching nearby entries in the Little Hash Table if the data is not found in the Little Hash Table at the row index and the column index.

Statement 16. An embodiment of the inventive concept includes a method according to statement 10, wherein accessing data in the memory using the physical address includes accessing the data in the Overflow Region using the physical address.

Statement 17. An embodiment of the inventive concept includes a method according to statement 10, further comprising:
 determining that the Little Hash Table is approaching capacity; and
 increasing a size of the Little Hash Table while reducing a size of the Overflow Region.

Statement 18. An embodiment of the inventive concept includes a method according to statement 17, wherein increasing a size of the Little Hash Table includes:
 doubling the size of the Little Hash Table; and
 reducing the size of the Overflow Region.

Statement 19. An embodiment of the inventive concept includes a method according to statement 17, wherein increasing a size of the Little Hash Table includes increasing a number of columns in the Little Hash Table.

Statement 20. An embodiment of the inventive concept includes a method according to statement 10, wherein:
 accessing data in the memory using the physical address includes writing the data to the memory; and
 mapping the logical address to a Physical Line Identifier (PLID) using a Translation Table includes selecting one of the Big Hash Table, the Little Hash Table, and the Overflow Region to write the data using the Translation Table.

Statement 21. An embodiment of the inventive concept includes a method according to statement 20, wherein determining if the physical address is in a Big Hash Table, a Little Hash Table, or an Overflow Region in a memory using the region identifier includes:
 applying a hash function to the data to produce a signature;
 checking a signature table for the signature; and
 if the signature is in the signature table, writing the data to the Overflow Region.

Statement 22. An embodiment of the inventive concept includes a method according to statement 21, wherein checking a signature table for the signature includes checking the signature table for the signature in a row in the physical address.

Statement 23. An embodiment of the inventive concept includes an embodiment of the inventive concept includes an article, comprising a non-transitory storage medium, the non-transitory storage medium having stored thereon instructions that, when executed by a machine, result in:
 receiving a logical address from a processor;
 mapping the logical address to a Physical Line Identifier (PLID) using a Translation Table, the PLID including a region identifier and a physical address;
 determining if the physical address is in a Big Hash Table, a Little Hash Table, or an Overflow Region in a memory using the region identifier; and
 accessing data in the memory using the physical address.

Statement 24. An embodiment of the inventive concept includes an article according to statement 23, wherein determining if the physical address is in a Big Hash Table, a Little Hash Table, or an Overflow Region in a memory using the region identifier includes determining that the physical address is in the Big Hash Table if a first bit in the region identifier is not set.

Statement 25. An embodiment of the inventive concept includes an article according to statement 23, wherein determining if the physical address is in a Big Hash Table, a Little Hash Table, or an Overflow Region in a memory using the region identifier includes determining that that the physical address is in the Little Hash Table if a first bit in the region identifier is set and a second bit in the region identifier is not set.

Statement 26. An embodiment of the inventive concept includes an article according to statement 23, wherein determining if the physical address is in a Big Hash Table, a Little Hash Table, or an Overflow Region in a memory using the region identifier includes determining that the physical address is in the Overflow Region if a first bit in the region identifier is set and a second bit in the region identifier is set.

Statement 27. An embodiment of the inventive concept includes an article according to statement 23, wherein accessing data in the memory using the physical address includes:
 determining a row index and a column index from the physical address; and
 accessing the data in one of the Big Hash Table and the Little Hash Table using the row index and the column index.

Statement 28. An embodiment of the inventive concept includes an article according to statement 27, wherein accessing the data in one of the Big Hash Table and the Little Hash Table using the row index and the column index includes searching nearby entries in the Little Hash Table if the data is not found in the Little Hash Table at the row index and the column index.

Statement 29. An embodiment of the inventive concept includes an article according to statement 23, wherein accessing data in the memory using the physical address includes accessing the data in the Overflow Region using the physical address.

Statement 30. An embodiment of the inventive concept includes an article according to statement 23, the non-transitory storage medium having stored thereon further instructions that, when executed by the machine, result in:

determining that the Little Hash Table is approaching capacity; and increasing a size of the Little Hash Table while reducing a size of the Overflow Region.

Statement 31. An embodiment of the inventive concept includes an article according to statement 30, wherein increasing a size of the Little Hash Table includes:

doubling the size of the Little Hash Table; and reducing the size of the Overflow Region.

Statement 32. An embodiment of the inventive concept includes an article according to statement 30, wherein increasing a size of the Little Hash Table includes increasing a number of columns in the Little Hash Table.

Statement 33. An embodiment of the inventive concept includes an article according to statement 23, wherein:

accessing data in the memory using the physical address includes writing the data to the memory; and mapping the logical address to a Physical Line Identifier (PLID) using a Translation Table includes selecting one of the Big Hash Table, the Little Hash Table, and the Overflow Region to write the data using the Translation Table.

Statement 34. An embodiment of the inventive concept includes an article according to statement 33, wherein determining if the physical address is in a Big Hash Table, a Little Hash Table, or an Overflow Region in a memory using the region identifier includes:

applying a hash function to the data to produce a signature;

checking a signature table for the signature; and if the signature is in the signature table, writing the data to the Overflow Region.

Statement 35. An embodiment of the inventive concept includes an article according to statement 34, wherein checking a signature table for the signature includes checking the signature table for the signature in a row in the physical address.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A memory system, comprising:

memory to store data;

a first table stored in a first portion of the memory, the first table including a number of buckets and a first number of ways;

a second table stored in a second portion of the memory, the second table including the number of buckets and a second number of ways;

a region stored in a third portion of the memory; and a third table to map a logical address to a physical identifier, the physical identifier including:

a region identifier identifying one of the first table, the second table, or the region; and a physical address in the one of the first table, the second table, or the region, wherein a first data is stored in one of the first table, the second table, or the region.

2. The memory system according to claim 1, wherein the region identifier includes a first bit indicating that the physical identifier identifies the first data is stored in the first table.

3. The memory system according to claim 2, wherein the physical address includes a row index and a column index.

4. The memory system according to claim 1, wherein the region identifier includes:

a first bit indicates indicating that the physical identifier does not identify the first data is stored in the first table; and a second bit indicating whether the physical identifier identifies the first data is stored in the second table or the region.

5. The memory system according to claim 1, wherein the second table may grow dynamically.

6. The memory system according to claim 1, further comprising a fourth table stored in the memory, the fourth table storing a plurality of signatures of data stored in the first table and the second table, wherein the fourth table may prevent storing multiple data with a common signature in a row in either the first table or the second table.

7. The memory system according to claim 1, further comprising a fourth table stored in the memory, the fourth table storing a plurality of signatures of data stored in the first table and the second table, wherein the fourth table may prevent storing multiple data with a common signature in a row in either the first table or the second table.

8. A method operable in a memory controller, comprising:

receiving a logical address from a processor;

mapping the logical address to a physical identifier using a third table, the physical identifier including a region identifier and a physical address;

determining whether the physical address is in a first table, second table, or a region in a memory using the region identifier; and accessing data in the memory using the physical address based at least in part on whether the physical address is in the first table, the second table, or the region.

9. The method according to claim 8, wherein determining whether the physical address is in a first table, a second table, or a region in a memory using the region identifier includes determining that the physical address is in the first table based at least in part on a first bit in the region identifier not being set.

10. The method according to claim 8, wherein determining whether the physical address is in a first table, a second table, or a region in a memory using the region identifier includes determining that the physical address is in the second table based at least in part on a first bit in the region identifier being set and a second bit in the region identifier not being set.

11. The method according to claim 8, wherein determining whether the physical address is in a first table, a second table, or a region in a memory using the region identifier includes determining that the physical address is in the region based at least in part on a first bit in the region identifier being set and a second bit in the region identifier being set.

12. The method according to claim 8, wherein accessing data in the memory using the physical address includes:

determining a row index and a column index from the physical address; and accessing the data in one of the first table and the second table using the row index and the column index.

13. The method according to claim 12, wherein accessing the data in one of the first table and the second table using the row index and the column index includes searching nearby entries in the second table based at least in part on the data not being found in the second table at the row index and the column index.

14. The method according to claim 8, further comprising:
    determining that the second table is approaching capacity; and
    increasing a size of the second table while reducing a size of the region.

15. The method according to claim 14, wherein increasing a size of the second table includes increasing a number of columns in the second table.

16. An article, comprising a non-transitory storage medium, the non-transitory storage medium having stored thereon instructions that, when executed by a machine, result in:
    receiving a logical address from a processor;
    mapping the logical address to a physical identifier using a third table, the physical identifier including a region identifier and a physical address;
    determining whether the physical address is in a first table, a second table, or a region in a memory using the region identifier; and
    accessing data in the memory using the physical address based at least in part on whether the physical address is in the first table, the second table, or the region.

17. The article according to claim 16, wherein determining whether the physical address is in a first table, a second table, or a region in a memory using the region identifier includes determining that the physical address is in the first table based at least in part on a first bit in the region identifier not being set.

18. The article according to claim 16, wherein determining whether the physical address is in a first table, a second table, or a region in a memory using the region identifier includes determining that the physical address is in the second table based at least in part on a first bit in the region identifier being set and a second bit in the region identifier not being set.

19. The article according to claim 16, wherein determining whether the physical address is in a first table, a second table, or a region in a memory using the region identifier includes determining that the physical address is in the region based at least in part on a first bit in the region identifier being set and a second bit in the region identifier being set.

20. The article according to claim 16, wherein accessing data in the memory using the physical address includes:
    determining a row index and a column index from the physical address; and
    accessing the data in one of the first table and the second table using the row index and the column index.

* * * * *